United States Patent
Jiang

(10) Patent No.: US 11,119,603 B2
(45) Date of Patent: Sep. 14, 2021

(54) TOUCH CONTROL CHIP, ELECTRONIC DEVICE HAVING THE SAME AND TOUCH DETECTION METHOD THEREFOR

(71) Applicant: SHENZHEN GOODIX TECHNOLOGY CO., LTD., Shenzhen (CN)

(72) Inventor: Hong Jiang, Shenzhen (CN)

(73) Assignee: SHENZHEN GOODIX TECHNOLOGY CO., LTD., Shenzhen (CN)

( * ) Notice: Subject to any disclaimer, the term of this patent is extended or adjusted under 35 U.S.C. 154(b) by 75 days.

(21) Appl. No.: 16/703,861

(22) Filed: Dec. 5, 2019

(65) Prior Publication Data

US 2020/0110527 A1 Apr. 9, 2020

Related U.S. Application Data

(63) Continuation of application No. PCT/CN2018/100703, filed on Aug. 15, 2018.

(51) Int. Cl.
*G06F 3/041* (2006.01)
*G06F 3/044* (2006.01)

(52) U.S. Cl.
CPC .......... *G06F 3/04164* (2019.05); *G06F 3/044* (2013.01); *G06F 2203/04104* (2013.01)

(58) Field of Classification Search
CPC ....................................................... G06F 3/044
See application file for complete search history.

(56) References Cited

U.S. PATENT DOCUMENTS

| 5,825,352 A | 10/1998 | Bisset et al. |
| 2007/0229468 A1* | 10/2007 | Peng .................. G06F 3/04847 345/173 |

(Continued)

FOREIGN PATENT DOCUMENTS

| CN | 107223230 A | 9/2017 |
| CN | 107454993 A | 12/2017 |

(Continued)

OTHER PUBLICATIONS

Extended European Search Report for corresponding EP application No. 18920193.2, European Patent Office, dated May 28, 2020, 14 pages total.

*Primary Examiner* — William Boddie
*Assistant Examiner* — Andrew B Schnirel

(57) ABSTRACT

The present disclosure relates to the field of touch technology, and provides a touch control chip, an electronic device and a touch detection method. The touch control chip (1) includes: a processing unit (10), a floating ground driving module (11) and an analog front end (12); the floating ground driving module (11) is connected to the analog front end (12), a detection end of the analog front end (12) is connected to a capacitive sensing component (3), and an output end of the analog front end (12) is connected to the processing unit (10); the processing unit (10) is configured to control the floating ground driving module (11) to provide a floating ground signal to the analog front end (12), the floating ground signal is used to enable the capacitive sensing component (3) to generate a sensing signal, the processing unit (10) performs touch detection according to the sensing signal.

19 Claims, 7 Drawing Sheets

(56) References Cited

U.S. PATENT DOCUMENTS

| | | | |
|---|---|---|---|
| 2010/0156805 A1 | 6/2010 | Brand et al. | |
| 2015/0035794 A1* | 2/2015 | Zhitomirskiy | G06F 3/0445 |
| | | | 345/174 |
| 2015/0145535 A1* | 5/2015 | Nys | H03K 17/955 |
| | | | 324/679 |
| 2015/0338958 A1* | 11/2015 | Decaro | G06F 3/04182 |
| | | | 345/174 |
| 2016/0018867 A1* | 1/2016 | Nys | G01R 27/2605 |
| | | | 324/674 |
| 2016/0364595 A1* | 12/2016 | Du | G06K 9/0002 |
| 2018/0210606 A1* | 7/2018 | Jiang | G06F 3/04166 |

FOREIGN PATENT DOCUMENTS

| | | |
|---|---|---|
| CN | 107765930 A | 3/2018 |
| CN | 107995967 A | 5/2018 |
| EP | 0438057 A2 | 7/1991 |
| EP | 0438057 A3 | 10/1991 |
| WO | 2005114369 A2 | 12/2005 |
| WO | 2005114369 A3 | 1/2006 |
| WO | 2016028341 A1 | 2/2016 |
| WO | 2018090366 A1 | 5/2018 |
| WO | 2018201460 A1 | 11/2018 |

* cited by examiner

TOUCH CONTROL CHIP, ELECTRONIC DEVICE HAVING THE SAME AND TOUCH DETECTION METHOD THEREFOR

CROSS-REFERENCE TO RELATED APPLICATION

This application is a continuation of International Application No. PCT/CN2018/100703, filed on Aug. 15, 2018, the application of which is hereby incorporated by reference in its entirety.

TECHNICAL FIELD

The present disclosure relates to the field of touch technology, and in particular to a touch control chip, an electronic device using the touch control chip and a touch detection method applied to the electronic device.

BACKGROUND

At present, capacitive touch technology is generally adopted in various scenarios requiring human-machine interaction, such as a mobile phone, a tablet computer and a laptop computer. Although the traditional touch circuit technology is mature, its functions remain seldom changed over many years, and therefore, there is still some room for improvement. With the development of technology, a multi-point hovering touch function emerges to bring better interaction experiences to users. However, it is difficult for a traditional touch circuit to support the hovering touch function.

The inventors find at least following problems exists in the existing technology: the traditional touch circuit performs touch detection by relying on a working voltage of an analog front end. Due to low detection sensitivity, the hovering touch function is not supported.

SUMMARY

Some embodiments of the present disclosure are intended to provide a touch control chip, an electronic device using the touch control chip and a touch detection method applied to the electronic device. A floating ground driving module is added in the traditional touch circuit, and touch detection is performed through a floating ground signal provided by the floating ground driving module. In this way, the detection sensitivity of the traditional touch circuit is effectively improved, thereby supporting the hovering touch function.

An embodiment of the present disclosure provides a touch control chip, including a processing unit, a floating ground driving module and an analog front end. The floating ground driving module is connected to the analog front end, a detection terminal of the analog front end is connected to a capacitive sensing component, and an output terminal of the analog front end is connected to the processing unit. The processing unit is configured to control the floating ground driving module to provide a floating ground signal to the analog front end, the floating ground signal is used to enable the capacitive sensing component to generate a sensing signal, and the processing unit performs touch detection according to the sensing signal.

An embodiment of the present disclosure further provides an electronic device, including the above-described touch control chip and a capacitive sensing component. The touch control chip is connected with the capacitive sensing component, and configured to perform touch detection through the capacitive sensing component.

An embodiment of the present disclosure further provides a touch detection method. The touch detection method is applied to the above-described electronic device, and a touch screen of the electronic device includes a plurality of sensing channels. The touch detection method includes: collecting touch data on the touch screen of the electronic device through a merged channel based on a preset channel merging strategy. Herein, the merged channel refers to a touch sensing channel formed by connecting two or more sensing channels to a same detection circuit of the analog front end. The touch detection method includes: determining a touch type according to the touch data; and performing a touch operation corresponding to the touch type.

Compared with the existing technology, an embodiment of the present disclosure provides an excitation signal for the capacitive sensing component by replacing the working voltage of the traditional analog front end itself with the floating ground signal provided by the floating ground driving module, so that the detection sensitivity of the traditional touch circuit may support hovering touch function.

In addition, the floating ground driving module includes a first driver and a second driver. An output terminal of the first driver is connected to a ground terminal of the analog front end, and the output terminal of the first driver is further connected to a power terminal of the analog front end through the second driver. The first driver is used to output the floating ground signal to the ground terminal of the analog front end, and the second driver is used to synchronously output the floating ground signal to the power terminal of the analog front end.

In an embodiment, the first driver is an inverter or a non-inverter. When the first driver is the non-inverter, the floating ground driving module is easier to control. When the first driver is the inverter, the floating ground driving module is more simplified in structure.

In an embodiment, the floating ground driving module further includes a protection diode. A positive end of the protection diode is connected to a power input terminal of the floating ground driving module, and a negative end of the protection diode is connected to the power terminal of the analog front end. In this embodiment, continuous power supply may be realized by the floating ground driving module.

In an embodiment, the touch control chip further includes a switch array. The capacitive sensing component is connected to the analog front end through the switch array, and the floating ground driving module is further configured to provide the floating ground signal to the processing unit and the switch array. In this embodiment, potentials of different modules inside the touch control chip are all controlled by the floating ground driving module, so that levels of different modules are consistent, and no level conversion is required, thereby reducing a complexity of the touch control chip.

In an embodiment, the touch control chip further includes a level converting module connected between the processing unit and an external main control unit. The level converting module is configured to convert a communication level of the processing unit into a communication level of the main control unit. In this embodiment, a stable communication between the touch control chip and the main control unit is guaranteed by the level converting module.

In an embodiment, the analog front end includes an operational amplifier and an integrator. The processing unit is configured to provide a preset floating ground control signal to the floating ground driving module. Herein each floating ground control signal includes P successive sub-control signals, and P is a natural number greater than 1. An input terminal of the integrator is connected to an output terminal of the operational amplifier, and is used to accumulate detection signals under actions of the P successive sub-control signals in each floating ground control signal. In this embodiment, signal identifiability may be increased by accumulating a plurality of detection signals, thereby improving an accuracy of the touch detection.

In an embodiment, collecting the touch data on the touch screen of the electronic device through the merged channel based on the preset channel merging strategy specifically includes: detecting a touch operation type of the electronic device, and collecting the touch data through the merged channel under the channel merging strategy corresponding to the touch operation type.

In an embodiment, when the touch operation type is a first type, collecting the touch data through the merged channel under the channel merging strategy corresponding to the touch operation type specifically includes: collecting the touch data by changing the merged channel from large to small.

In an embodiment, when the touch operation type is a second type, the merged channel is a preset large channel, and the touch data is collected by using the preset large channel.

In an embodiment, the preset large channel includes a merged channel obtained in any of the following merging manners: merging all sensing channels of the touch screen, merging sensing channels in an upper half of the touch screen, merging sensing channels in a lower half of the touch screen, and merging sensing channels outside an edge of the touch screen.

In an embodiment, collecting the touch data by changing the merged channel from large to small specifically includes: collecting the touch data by using an initial large channel, reducing the merged channel if a touch signal is detected from the touch data collected by using the initial large channel, continuing reducing the merged channel until the merged channel is a preset small channel if a touch signal is detected from the touch data collected by the reduced merged channel, and collecting the touch data by using the preset small channel.

In an embodiment, if a touch signal is not detected from the touch data collected by using the reduced merged channel, the merged channel before reduction is used to collect the touch data and detect the touch signal; if a touch signal is not detected by using the merged channel before reduction, the merged channel is further increased until the merged channel is restored to the initial large channel.

In an embodiment, if a touch signal is detected by using the merged channel before reduction, the touch data is collected by using the merged channel before reduction.

In an embodiment, if a signal quantity in the touch data collected by using the preset small channel is greater than a touch threshold, switching to a touch detection mode is performed, where the merged channel in the touch detection mode is smaller than the preset small channel.

In an embodiment, determining the touch type according to the touch data specifically includes: extracting a plurality of frames of data from the touch data; obtaining a touch subject by performing an analysis according to the plurality of frames of data, and calculating a touch coordinate of each frame of data by a gravity center method; and obtaining a touch gesture according to the touch subject and the touch coordinate of each frame of data.

In an embodiment, the touch gesture includes any of the following: single-finger hover, single-finger motion, double-finger motion, three-finger motion and palm motion.

BRIEF DESCRIPTION OF THE DRAWINGS

One or more embodiments will be illustrated with figures in corresponding accompanying drawings, and these illustrative descriptions do not constitute limitations to the embodiments. Like numerals in the accompanying drawings represent similar elements. The figures in the accompanying drawings are also not limited in proportions, unless stated otherwise.

DETAILED DESCRIPTION

To make the objectives, technical solutions and advantages of the present disclosure more clear, some embodiments of the present disclosure will be further described in detail below in combination with accompanying drawings and embodiments. It is to be understood that the specific embodiments described herein are only used to explain the present disclosure rather than limit the present disclosure.

In some embodiments of the present disclosure, to overcome the problem that the traditional touch circuit has low sensitivity and cannot support the hovering touch function, touch detection is realized by providing the excitation signal to the capacitive sensing component (i.e., a sensing channel) through the floating ground driving module rather than the analog front end in the touch circuit. Therefore, the sensitivity of touch detection may be effectively improved since the floating ground signal may provide a larger excitation signal compared with the analog front end. In this way, the traditional touch circuit can realize detection of hovering touch. Implementation details of the touch control chip will be specifically described below through the following embodiments. The following implementation contents are only provided for convenience of understanding, and are not necessary for implementation of the solution.

Figure 1:
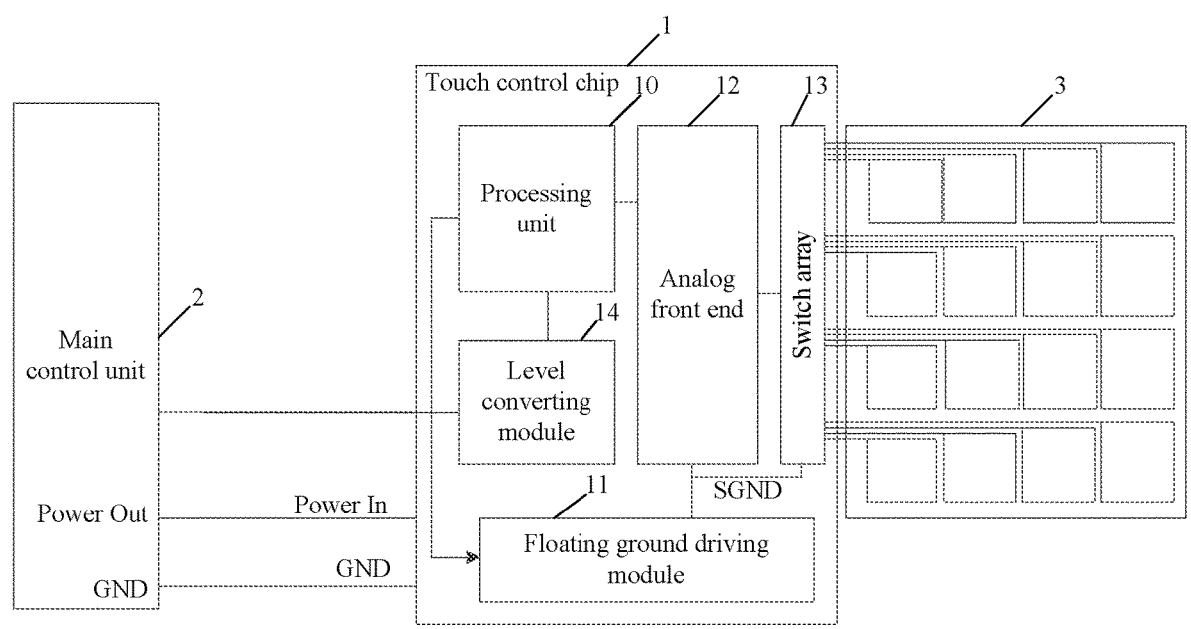
FIG. 1 is a schematic diagram illustrating structures of a touch control chip and an electronic device using the touch control chip according to a first embodiment of the present disclosure.

As shown in FIG. 1, a touch control chip 1 of a first embodiment may be applied to, but not limited to, electronic devices such as a mobile phone and a tablet computer. The touch control chip 1 includes: a processing unit 10, a floating ground driving module 11 and an analog front end 12. The floating ground driving module 11 is connected to the analog front end 12, a detection terminal of the analog front end 12 is connected to a capacitive sensing component 3 of the electronic device, and an output terminal of the analog front end 12 is connected to the processing unit 10. The processing unit 10 is configured to control the floating ground driving module 11 to provide a floating ground signal to the analog front end 12, the floating ground signal is used to enable the capacitive sensing component 3 to generate a sensing signal, and the processing unit 10 performs touch detection according to the sensing signal.

Specifically, the touch control chip 1 is connected with a main control unit 2 of the electronic device via a communication bus. The main control unit 2 may be, for example, a Central Processing unit (CPU) or an Application Processor (AP) of the electronic device. The main control unit 2 may perform communication and data exchange with the touch control chip 1 via the communication bus. The main control unit 2 may also supply power for the touch control chip 1. The capacitive sensing component 3 is generally connected with the touch control chip 1 through a wire. In a practical application, the touch control chip 1 may also include a switch array 13. The capacitive sensing component 3 includes, for example, a plurality of sensing electrodes, and each sensing electrode may be selectively connected to the analog front end 12 through the switch array 13, so that the sensing signal of the sensing electrode connected with the analog front end 12 is sent into the detection terminal of the analog front end 12. The analog front end 12 is configured to amplify the sent sensing signal of one or more sensing electrodes and convert the signal into a voltage signal, and the processing unit 10 is configured to detect a change of the voltage signal output by the analog front end 12, thereby realizing touch detection. However, the above-described is not limited herein. In a practical application, the processing unit may also convert the sensing signal of the capacitive sensing component into a current signal, and realize touch detection according to a change of the current signal.

The floating ground driving module 11 may output a floating ground signal under the control of the processing unit 10. In a practical application, the floating ground signal may be switched between high level and low level. The floating ground signal enables the analog front end 12 to continually switch between a floating ground state and a non-floating ground state. In this case, touch detection is realized by providing the excitation signal to the capacitive sensing component 3. When the floating ground signal is at a low level, a potential of a ground terminal (SGND) of the analog front end 12 is same as a potential of a ground terminal (GND) of the electronic device, which is referred to as the non-floating ground state. When the floating ground signal is at a high level, the potential of the ground terminal (SGND) of the analog front end 12 is higher than the potential of the ground terminal (GND) of the electronic device, which is referred to as the floating ground state. A potential of the ground terminal of the capacitive sensing component 3 is same as the potential of the ground terminal (GND) of the electronic device.

Figure 2A:
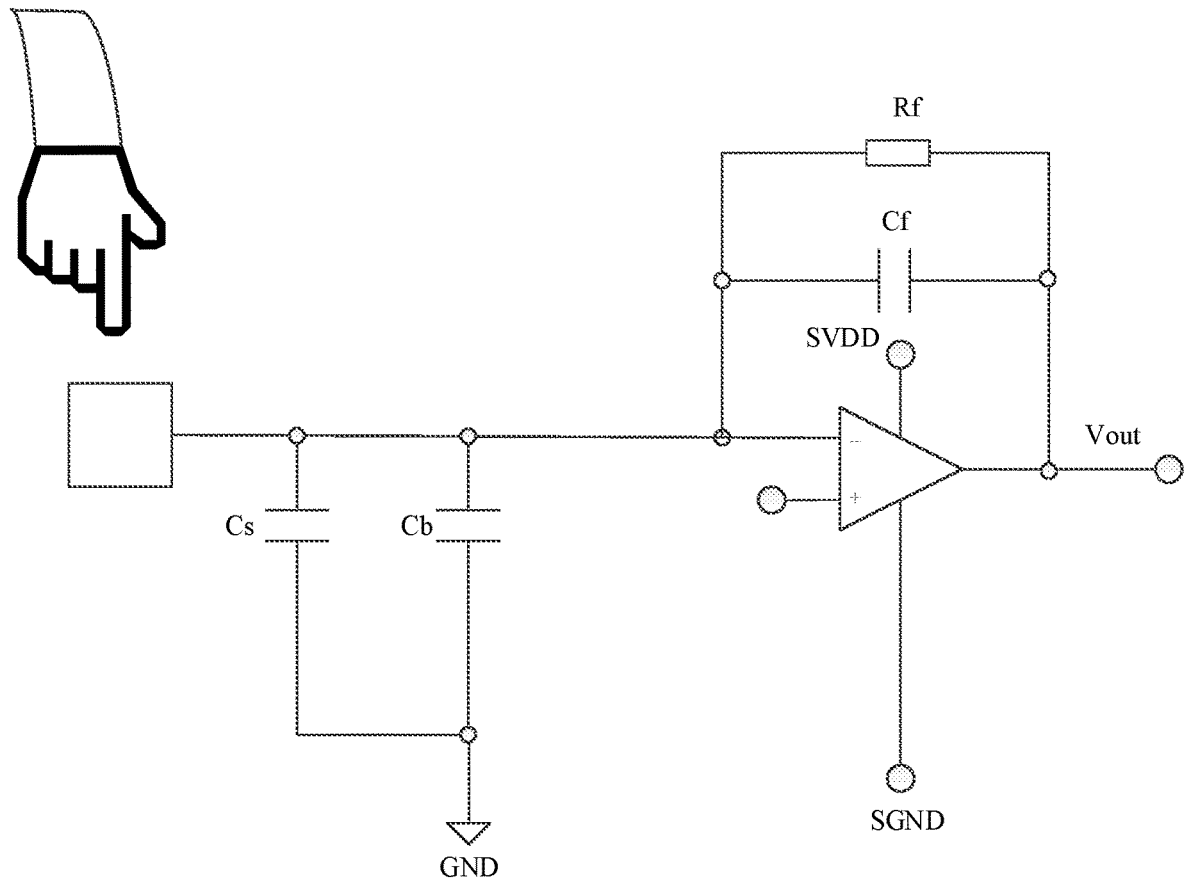
FIG. 2a is a circuit diagram illustrating an analog front end according to the first embodiment of the present disclosure.

Referring to a schematic diagram illustrating a structure of an analog front end shown in FIG. 2a, the analog front end includes a plurality of detection circuits, and FIG. 2a only illustrates one of the detection circuits. The number of detection circuits may be, for example, 16 or 32, but is not limited herein. The number of detection circuits may be set according to an actual requirement.

In this embodiment, the detection circuit may be a known capacitive detection circuit. Specifically, the detection circuit may include an operational amplifier and an analog-digital converter (not shown), and the like. The sensing electrode in the capacitive sensing component 3 is connected to a detection terminal (i.e., a negative input terminal) of the operational amplifier through the switch array 13. A capacitor Cb represents a capacitor of one or more sensing electrodes connected to the detection terminal of the operation amplifier, and a capacitor Cs represents a coupling capacitor generated when a finger or the like approaches the sensing electrode. In the non-floating state, the potential of the ground terminal (SGND) of the operational amplifier is same as the potential of the ground terminal (GND) of the capacitor Cb. In the floating state, the potential of the ground terminal (SGND) of the operational amplifier is driven by the floating ground driving module 11 to be at the high level. At this time, a voltage of the SGND is denoted as Vf, and the operational amplifier will boost a voltage Vf at both ends of the capacitor Cb. When the capacitive voltage of the capacitor Cb is boosted, the operational amplifier is required to charge the capacitor Cb with an increased charge quantity of Cb*Vf, and the charge quantity will be transferred from the output terminal of the operational amplifier to the capacitor Cb through feedback branches (i.e., Cf and Rf) of the operational amplifier. When the capacitor Cb is charged, if the finger or the like approaches, the coupling capacitor Cs connected in parallel with the Capacitor Cb will be generated, a charge quantity to be transferred will also be increased by Cs*Vf, an output voltage of the operational amplifier in this case will become higher than that in a case of only existence of the capacitor Cb. It is determined whether a finger or the like approaches or touches the capacitive sensing component 3 by detecting a change value of the output voltage of the operational amplifier. Therefore, the floating ground signal provided by the floating ground driving module 11 may provide an excitation signal to the capacitive sensing component 3 by replacing the working voltage of the analog front end 12 in the traditional touch circuit, thereby realizing touch detection.

Figure 3:
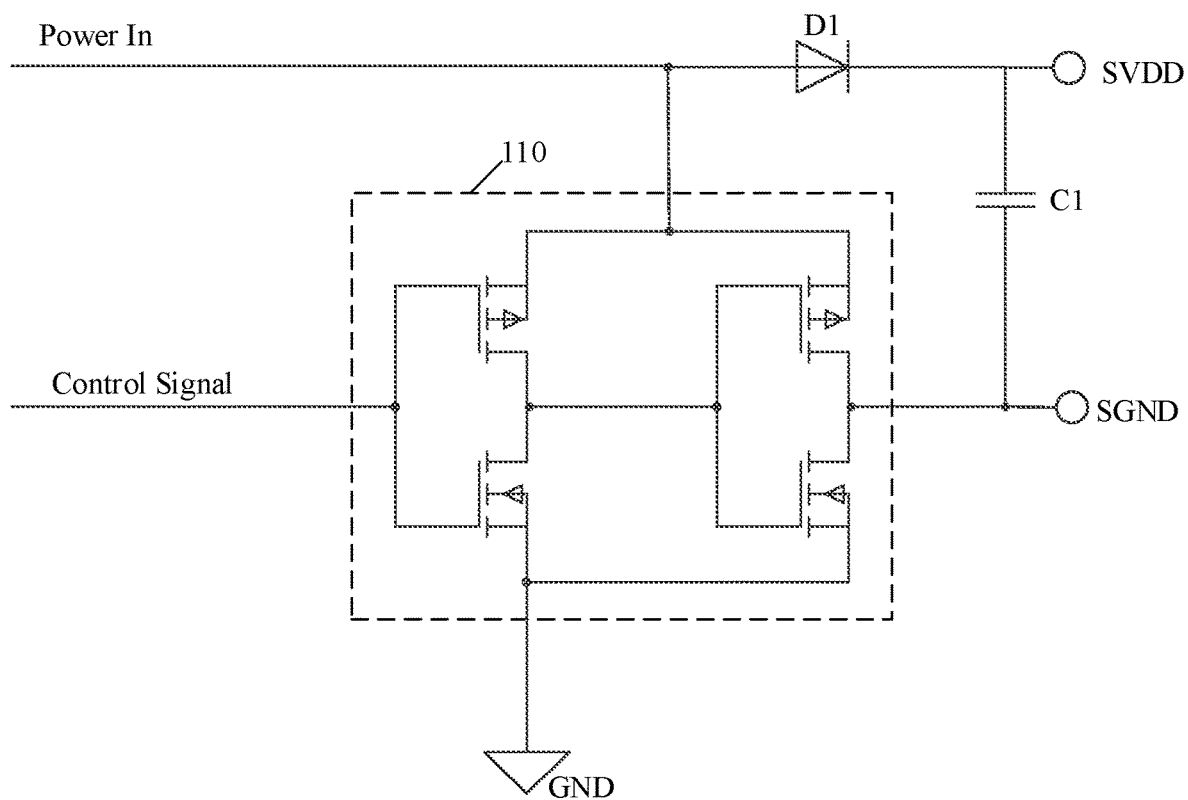
FIG. 3 is a circuit diagram illustrating a floating ground driving module according to the first embodiment of the present disclosure.

In this embodiment, the floating ground driving module 11 includes a first driver 110 and a second driver. An output terminal of the first driver 110 is connected to the ground terminal of the analog front end 12, and the output terminal of the first driver 110 is further connected to the power terminal of the analog front end 12 through the second driver. The first driver 110 is used to output a floating ground signal to the ground terminal of the analog front end 12, and the second driver is used to synchronously output a floating ground signal to the power terminal of the analog front end 12. Specifically, as shown in FIG. 3, the first driver 110 includes two-stages of inverters, and the two stages of inverters are cascaded to form a non-inverter, that is, an output of a front-stage inverter is connected to an input of a rear-stage inverter. The second driver is, for example, a capacitor C1. The output terminal of the first driver 110, i.e., an output terminal of the rear-stage inverter, serves as a ground output terminal (i.e., SGND) of the floating ground driving module 11. The output terminal of the rear-stage inverter is also connected with a first end of the capacitor C1, and a second end of the capacitor C1 is connected to the power terminal (SVDD) of the analog front end 12. A power supply (Power In) of the floating ground driving module 11 may be from the main control unit 2, where the main control unit 2 may provide, for example, a power supply of 5 V. Compared with the working voltage of 3.3 V of the traditional touch circuit, the power supply of 5 V may provide a larger excitation signal to the capacitive sensing component. In a practical application, for example, a power supply of 7 V to tens of Volts may also be provided to the floating ground driving module, thereby significantly improving the sensitivity of the hovering touch detection.

Figure 5:
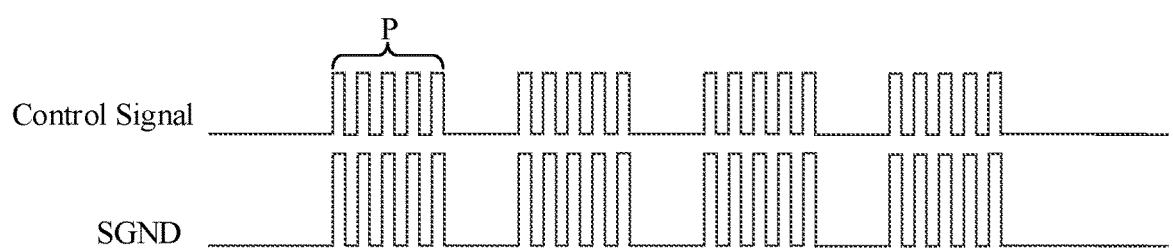
FIG. 5 is a timing diagram illustrating input and output signals of a floating ground driving module according to the second embodiment of the present disclosure.
Figure 6:
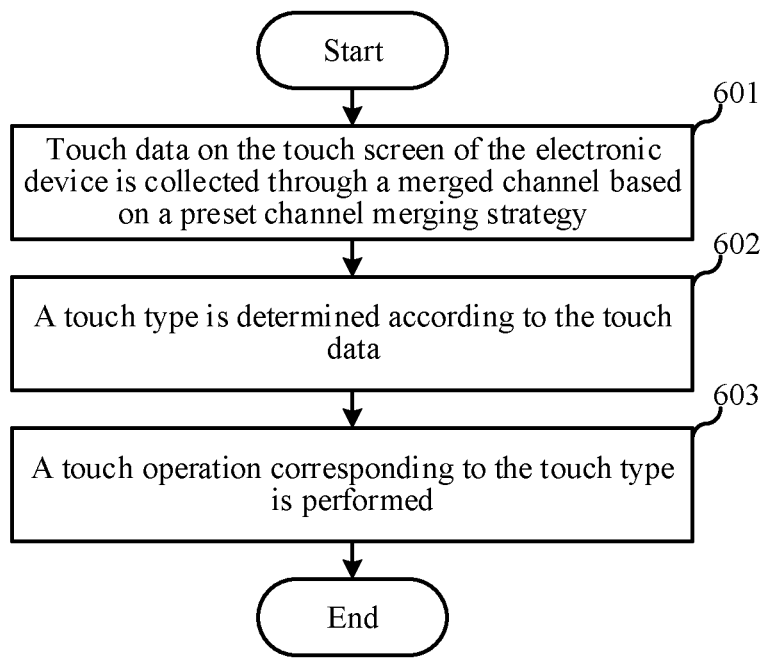
FIG. 6 is a flowchart illustrating a touch detection method according to a fourth embodiment of the present disclosure.

A control signal of the floating ground driving module 11 comes from the processing unit 10. In this embodiment, as shown in FIG. 5 and FIG. 1, the processing unit 10 is configured to provide a preset floating ground control signal to the floating ground driving module 11. Herein, each floating ground control signal includes P successive sub-control signals, and for example, P is 5. That is, the processing unit 10 continuously outputs 5 signals of high and low levels to the floating ground driving module 11, and the analog front end 12 will obtain one detection signal under the action of each signal of high or low level. P may be another natural number greater than 1, which is not specifically limited herein.

Figure 2B:
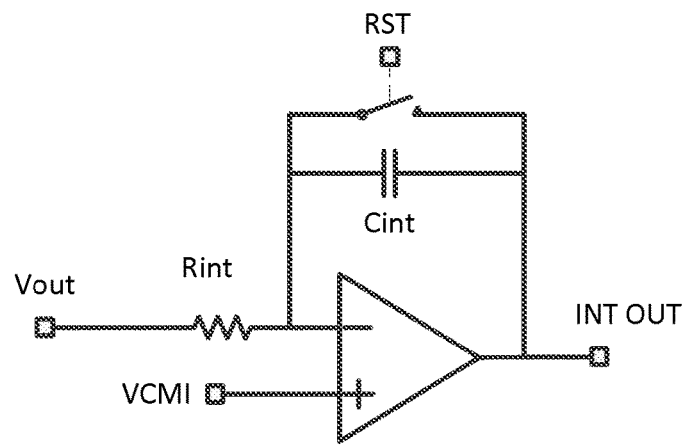
FIG. 2b is a circuit diagram illustrating an integrator according to the first embodiment of the present disclosure.

With continuous reference to FIG. 2a and FIG. 2b, the detection circuit of the analog front end further includes an integrator. An input terminal of each integrator is connected to the output terminal of each operational amplifier respectively. The integrator is used to accumulate detection signals under the actions of the P successive sub-control signals in each floating ground control signal, that is, to accumulate P detection signals, so that the signal quantity obtained through single detection is increased, thereby preventing excessively small signal quantity from affecting the detection accuracy. In an example, the integrator may also be cancelled, and P detection signals output by the analog front end are accumulated by the processing unit. The accumulation manner of the detection signals is not specifically limited herein.

In this embodiment, the floating ground signal is in phase with the floating ground control signal. When the floating ground control signal output by the processing unit 10 is of high level, the floating ground driving module 11 outputs a floating ground signal of high level. At this time, the floating ground driving module 11 boosts the potential of the ground terminal of the analog front end 12. When the floating ground control signal output by the processing unit 10 is of low level, the floating ground driving module 11 outputs a floating ground signal of low level to the analog front end 12, and the potential of the ground terminal (SGND) of the analog front end 12 is same as the potential of the ground terminal (GND) of the electronic device. When the floating ground signal is at a high level, the voltage of the first end of the capacitor C1 is boosted. Since the voltage at both ends of the capacitor cannot jump, the voltage of the second end of the capacitor C1, that is, the voltage of the power terminal of the analog front end 12, will be synchronously boosted, thereby keeping the working voltage of the analog front end 12 unchanged. Since the floating ground control signals are level signals switched between high level and low level, the analog front end 12 is switched between the floating ground state and the non-floating ground state under the drive of the floating ground driving module 11.

In this embodiment, the processing unit 10, the analog front end 12 and the switch array 13, and the like are all powered by the floating ground driving module 11. Specifically, the floating ground driving module 11 may further include a protection diode D1. A positive end of the protection diode D1 is connected to an input power supply (Power In) of the floating ground driving module 11, and a negative end of the protection diode D1 is connected to the second end of the capacitor C1. The ground terminals of the processing unit 10, the analog front end 12 and the switch array 13 are all connected to the ground output terminal (SGND) of the floating ground driving module 11, and the power terminals of the processing unit 10, the analog front end 12 and the switch array 13 are all connected to the output power terminal (SVDD) of the floating ground driving module 11. When the floating ground driving module 11 outputs a low level, the processing unit 10, the analog front end 12 and the switch array 13 may be all powered by the input power supply (Power In) of the floating ground driving module 11 and the capacitor C1. When the floating ground driving module 11 outputs a high level, the protection diode D1 is in a reverse blocking state. At this time, the processing unit 10, the analog front end 12 and the switch array 13 may be all powered by the capacitor C1. The protection diode D1 may also prevent signals on the capacitor C1 from back-flowing into the input power supply (Power In). In a practical application, the floating ground driving module 11 may supply power for each module inside the touch control chip 1, so that the communication levels of different modules inside the touch control chip 1 are consistent, thereby avoiding affecting normal communication between different modules.

In a practical application, the touch control chip 1 may further include a level converting module 14. The level converting module 14 is disposed between the processing unit 10 and the main control unit 2 to convert a communication level of the processing unit 10 into a communication level of the main control unit 2, thereby ensuring normal communication between the processing unit 10 and the main control unit 2.

In some examples, the floating ground signal may not be provided to the processing unit 10. At this time, a level converting module is disposed between the analog front end 12 and the processing unit 10, so that a communication level of the analog front end 12 is converted into a communication level of the processing unit 10, thereby ensuring stable communication between the analog front end 12 and the processing unit 10.

Compared with the existing technology, a stronger excitation signal is provided to the capacitive sensing component by replacing the analog front end with the floating ground driving module, so that the sensitivity of the touch detection is improved. In this case, the traditional touch circuit can support hovering touch function.

A second embodiment of the present disclosure relates to a touch control chip. The second embodiment and the first embodiment are substantially same with a main difference as follows: in the first embodiment, the first driver of the floating ground driving module adopts a non-inverter, so that an output level of the floating ground driving module is in phase with a control level of the processing unit; in the second embodiment, the floating ground driving module adopts an inverter, so that the implementation of the present disclosure is enriched.

Figure 4:
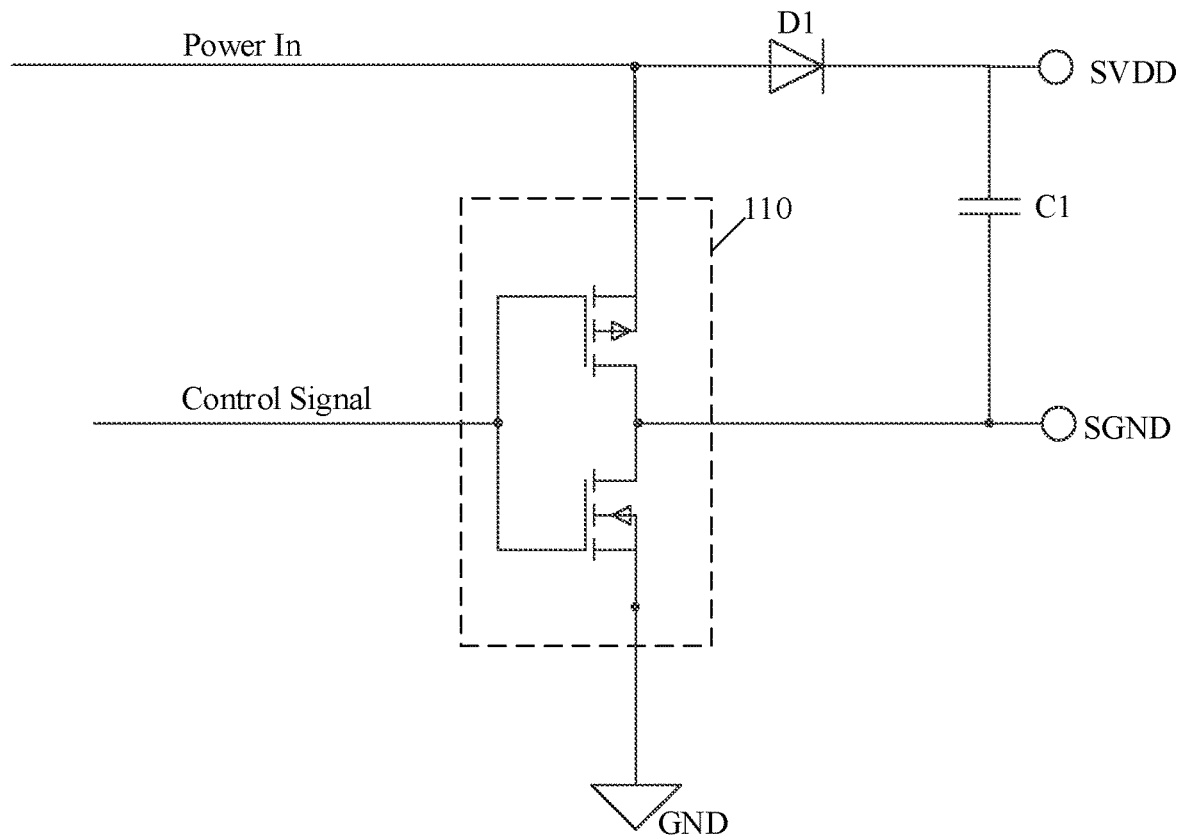
FIG. 4 is a circuit diagram illustrating a floating ground driving module according to a second embodiment of the present disclosure.

As shown in FIG. 4, the first driver 110 is an inverter, the output end of the inverter is used as the ground output terminal (SGND) of the floating ground driving module, and the first end of the capacitor C1 is connected to the output end of the first-stage inverter.

Since the first driver 110 is an inverter, the output signal of the floating ground driving module is out of phase with the control signal of the processing unit. That is, when the processing unit outputs a high level, the floating ground driving module 11 outputs the floating ground signal; when the processing unit outputs a low level, the floating ground driving module 11 does not output the floating ground signal. That is, the floating ground driving module 11 continuously outputs a low level rather than signals switching between high level and low level.

Compared with the above-described embodiment, one inverter is removed from the floating ground driving module in this embodiment, which simplifies the complexity of the touch control chip.

A third embodiment of the present disclosure relates to an electronic device, including the touch control chip and the capacitive sensing component described in the first or second embodiment. The touch control chip is connected with the capacitive sensing component, and configured to perform touch detection through the capacitive sensing component.

With continuous reference to FIG. 1, in a practical application, the capacitive sensing component may include a plurality of sensing electrodes. The plurality of sensing electrodes may be arranged in a matrix, and the sensing electrodes may be shaped in a regular pattern, such as a square, a diamond, a triangle and a circle, or the sensing electrodes may be arranged in an irregular shape or pattern filling up the entire screen. In this embodiment, a plurality of sensing electrodes may be connected to one or more detection circuits through the switch array. When a plurality of detection circuits are connected with the capacitive sensing components respectively, multi-point touch or multi-point hovering touch detection may be realized.

Compared with the existing technology, the touch control chip of the electronic device realizes touch detection through the floating ground signal provided by the floating ground driving module in this embodiment. Therefore, compared with a solution of performing touch detection by directly using the working voltage of the analog front end in the traditional touch circuit, the sensitivity of the touch detection is effectively improved, so that the traditional touch circuit can support the hovering touch function.

A fourth embodiment of the present disclosure relates to a touch detection method. The method is applied to the electronic device as described in the third embodiment, and the electronic device includes, but not limited to, a mobile phone and a tablet computer. A touch screen of the electronic device includes a plurality of sensing channels, i.e. a plurality of capacitive sensing components shown in FIG. 1. The touch detection method includes steps 601-603.

At step 601, touch data on the touch screen of the electronic device is collected through a merged channel based on a preset channel merging strategy.

The merged channel refers to a touch sensing channel formed by connecting two or more sensing channels to a same detection circuit of an analog front end. Therefore, the merged channel is a sensing channel larger than the square sensing electrode shown in FIG. 1.

At step 602, a touch type is determined according to the touch data.

At step 603, a touch operation corresponding to the touch type is performed.

When a hovering touch is performed, the higher a hovering height is, the faster a touch signal is attenuated. That is, the sensitivity of the hovering touch is lower for a higher hovering height. In some embodiments of the present disclosure, the touch data is collected by using the merged channel, thereby improving the sensitivity of the hovering touch through the merged channel.

Specifically, step 601 includes: detecting a touch operation type of the electronic device, and collecting the touch data by using the merged channel under the channel merging strategy corresponding to the touch operation type. In other words, in a practical application, there may be a plurality of channel merging strategies. For example, the touch operation type includes a first type and a second type. The first type, for example, corresponds to a hovering touch operation mode. In the hovering touch operation mode, the channel merging strategy is, for example, a large-to-small channel merging manner. The second type corresponds to, for example, a proximity sensing operation mode. In the proximity sensing operation mode, the channel merging strategy is, for example, performing touch detection always by using the large merged channel, which is not limited herein. In a practical application, one or more channel merging manners may be applied, and the touch operation modes corresponding to different channel merging manners may also be flexibly set.

The large-to-small channel merging strategy will be described below in detail.

Figure 7:
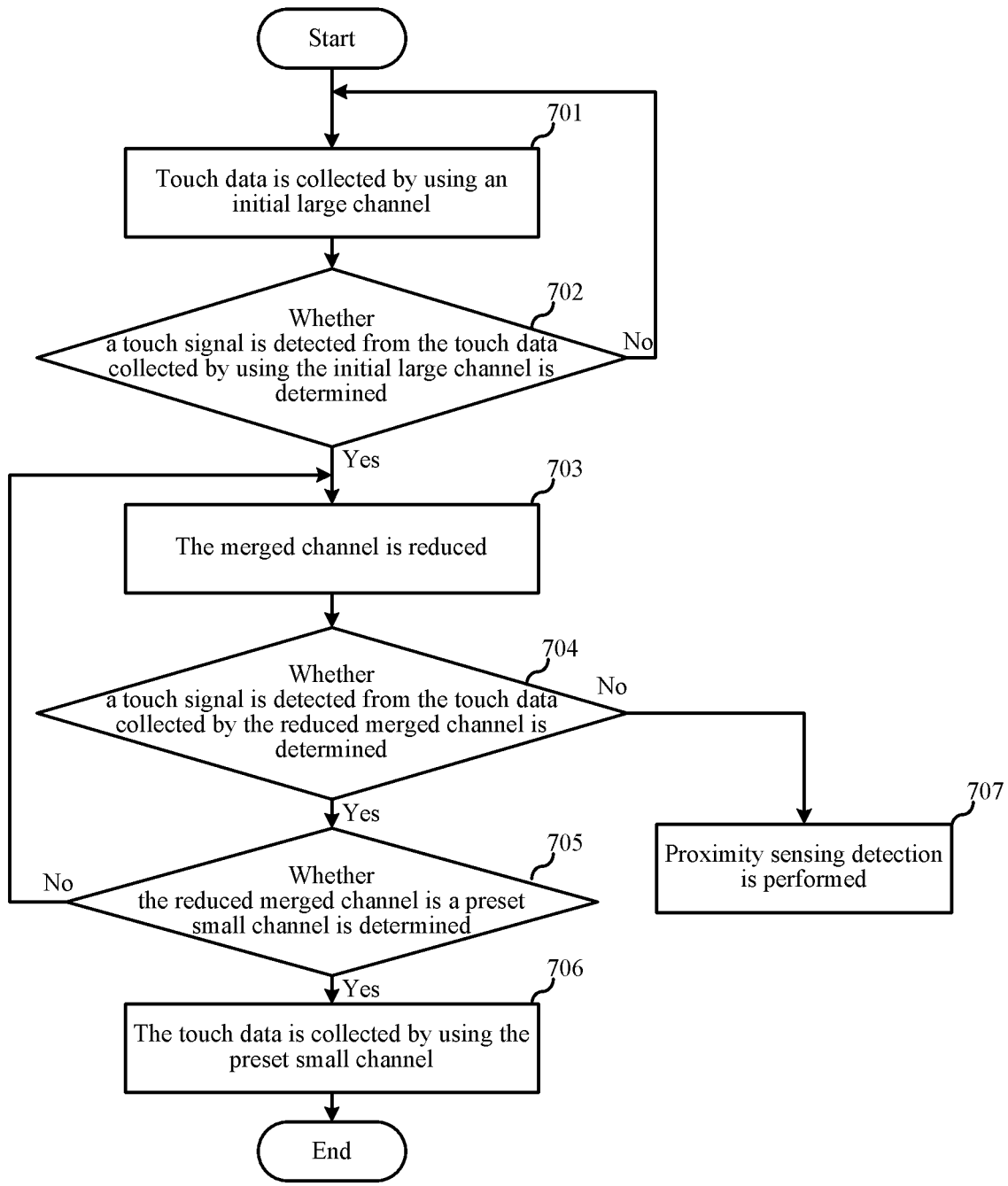
FIG. 7 is a flowchart illustrating merging channels from large to small in a touch detection method according to the fourth embodiment of the present disclosure.

When the touch operation type is the first type, the touch data is collected by changing the merged channel from large to small. The first type is, for example, a touch operation type defaulted by the electronic device. For example, when the screen is turned on and is not in a call state, the touch operation type is the first type. In this embodiment, as shown in FIG. 7, the touch data is collected by changing the merged channel from large to small, which specifically includes steps 701-707.

At step 701, the touch data is collected by using an initial large channel.

A touch signal quantity of a capacitive sensing channel in a case of hovering touch is positively correlated with an area of the channel covered by a touch subject such as a palm or a finger. That is, a larger area of covered sensing channel will generate a larger sensing signal quantity (also referred to as a touch signal quantity). On the contrary, a smaller area of covered sensing channel will generate a smaller sensing signal quantity. However, since the area of a single sensing channel is very limited, the touch signal quantity of a single unmerged sensing channel is limited. When the touch data is collected by using the initial large channel, since an area of the channel covered by the touch subject is greatly increased, a large touch signal quantity may be detected by using the initial large channel. Therefore, a touch event may be detected when a hovering height is high.

Figure 8:
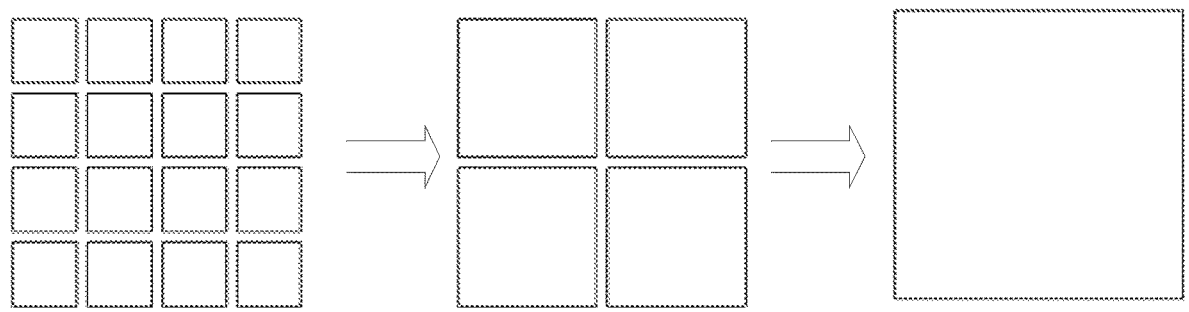
FIG. 8 is a schematic diagram illustrating merging channels in a touch detection method according to the fourth embodiment of the present disclosure.

FIG. 8 is a schematic diagram of merging channels according to an example of the present disclosure. For example, the left side in FIG. 8 is original sensing channels in an unmerged state, and the number of sensing channels is not limited to the number shown in FIG. 8; the middle in FIG. 8 is a schematic diagram of merging channels into four large sensing channels; the right side in FIG. 8 is a schematic diagram of merging all original sensing channels of the touch screen into one large sensing channel. The initial large channel may be a channel obtained by merging all sensing channels of the touch screen, which is not limited herein. In some example, the initial large channel may also be a sensing channel obtained by merging sensing channels in the upper half of the touch screen, or a sensing channel obtained by merging sensing channels in the lower half of the touch screen or a sensing channel obtained by merging sensing channels outside an edge of the touch screen.

At step 702, whether a touch signal is detected from the touch data collected by using the initial large channel is determined. If the touch signal is detected, step 703 is performed; if the touch signal is not detected, a return is made to step 701.

A touch signal quantity of a particular hovering height under the initial large channel may be obtained through an actual test or simulation. When the detected touch signal quantity is greater than or equal to the touch signal quantity of the hovering height, it is determined that the touch signal is detected. When the detected touch signal quantity is smaller than the touch signal quantity of the hovering height, it is determined that the touch signal is not detected. The detection manner of the touch signal is not specifically limited herein.

At step 703, the merged channel is reduced.

A relationship of the merged channels of different sizes and the detection sensitivities of different hovering heights may be obtained through simulation in advance. For example, the hovering heights corresponding to the merged channels of three different sizes may be obtained through test. When the merged channel is reduced, the initial large channel is adjusted to a smaller merged channel in a descending order of hovering heights.

At step 704, whether a touch signal is detected from the touch data collected by using the reduced merged channel is determined. If a touch signal is detected from the touch data collected by using the reduced merged channel, step 705 is performed; otherwise, step 707 is performed.

At step 705, whether the reduced merged channel is a preset small channel is determined. If the reduced merged channel is the preset small channel, step 706 is performed; if the reduced merged channel is not the preset small channel, a return is made to step 703.

The merged channel may be reduced to the preset small channel by repeating the above-described steps 703-705 on the basis of detecting the hovering touch signal.

At step 706, the touch data is collected by using the preset small channel.

The preset small channel is, for example, a merged channel corresponding to an optimal hovering operation height obtained through pretest. The preset small channel is, for example, a larger sensing channel obtained by merging four sensing channels shown in FIG. 1, which is not limited herein. In this case, the hovering touch operation of the user may be sensitively detected by using the preset small channel after the user learns the optimal hovering touch height.

In the step 706, if the signal quantity in the touch data collected by using the preset small channel, for example, the sensing signal quantity generated when a finger touches on the sensing channel, is greater than a touch threshold, switching to a touch detection mode is performed, where the merged channel in the touch detection mode is smaller than the preset small channel. Therefore, switching from the hovering touch mode to the touch detection mode can be flexibly performed in this embodiment.

At step 707, proximity sensing detection is performed.

Specifically, step 707 includes: collecting the touch data by using the merged channel before reduction and detecting the touch signal. If a touch signal is not detected from the merged channel before reduction, the merged channel is further increased until the merged channel is restored to the initial large channel.

In this embodiment, the hovering touch operations such as a touch gesture and proximity sensing may be supported. The merged channel corresponding to the optimal hovering height of the touch gesture is, for example, the preset small channel, and the hovering height of the proximity sensing is, for example, greater than the hovering height of the touch gesture. Therefore, the merged channel of the proximity sensing preferably is greater than the preset small channel. In this embodiment, when the hovering touch operation is the proximity sensing, the merged channel may be increased through step 707, thereby detecting the proximity sensing (described below in detail). Further, the merged channel is gradually reduced from large to small, which is conducive to detecting the touch event of the higher hovering height.

In a practical application, the touch data may be collected by changing the merged channel from large to small or by reducing the initial large channel directly to the preset small channel. The adjusting method of the merged channel is not limited herein.

When the touch operation type is the second type, the emerged channel is a preset large channel, and the touch data is collected by using the preset large channel, that is, the touch data is always collected by using the larger channel. For example, the preset large channel may include a merged channel obtained in any of the following merging manners: merging all sensing channels of the touch screen, merging sensing channels in the upper or lower half of the touch screen, and merging sensing channels outside an edge of the touch screen. The second type, for example, refers to that the screen is turned on and in a call state, which is not limited herein.

Determining the touch type according to the touch data at step 602 specifically includes: extracting a plurality of frames of data from the touch data; obtaining a touch subject by analyzing the plurality of frames of data, calculating a touch coordinate of each frame of data by a gravity center method, and obtaining a touch gesture according to the touch subject and the touch coordinate of each frame of data.

Figure 9:
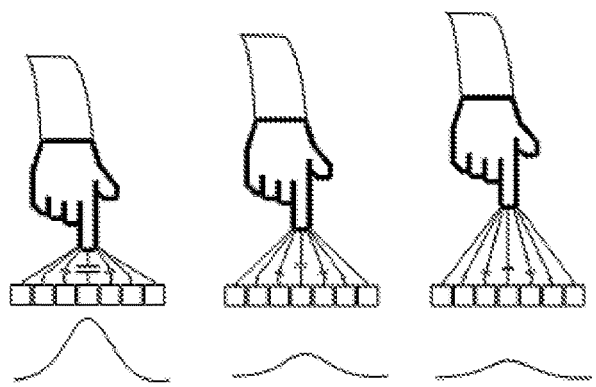
FIG. 9 is a schematic diagram illustrating envelope signals according to the fourth embodiment of the present disclosure.

Calculating the touch coordinate by the gravity center method will be detailed below in combination with data characteristics of the hovering operation shown in FIG. 9. When a finger approaches the touch screen, a sensing channel closer to the finger, for example, the merged channel, may have a large coupling capacitance, and a sensing channel further from the finger may have a small coupling capacitance. A plurality of sensing channels having different distances from the finger will form envelope signals as shown in FIG. 9. The coordinate of the finger may be calculated by searching for a gravity center of an envelope peak. For example, when three fingers approach the touch screen, there will be three envelope peaks, and the coordinate of each finger may be obtained by calculating the gravity center of each envelope peak. It can also be seen from FIG. 9 that the envelope peak changes in size when a finger height changes: the higher the finger height is, the smaller the envelope peak is, that is, the weaker the signal is; the lower the finger height is, the larger the envelope peak is. Therefore, the hovering height may be calculated according to the size of the envelope peak. When the hovering height is low enough, the traditional touch detection mode may be identified and switching to the touch detection mode is performed.

In this embodiment, touch points of the hovering touch operations may be determined according to the number of envelope signals. For example, one touch point corresponds to one finger. The touch subject may also be obtained by analyzing the area of the envelope signal. Specifically, the area of each envelope signal or the equivalent number of merged channels in the envelope signal may be compared with the area of the preset envelope signal of finger or palm. When the area of the envelope signal is approximate to that of the preset envelope signal of the palm, it is determined that the touch subject is the palm. When the area of the envelope signal is approximate to that of the preset envelope signal of the finger, it is determined that the touch subject is the finger.

In some examples, the touch subject such as a human face or a human ear may also be obtained by analyzing the touch data. The touch data, for example, is collected by using the initial large channel or the preset large channel, which is not limited herein. For example, the touch data may also be collected by a merged channel greater than the preset small channel and smaller than the initial large channel. When the touch data is collected by using the merged channel, such as the initial large channel or the preset large channel, the human face, the human ear, the palm and the finger, and the like may be obtained by analyzing different touch signal quantities under different coverage areas. When the touch data is collected by using the smaller merged channel, such as the preset small channel, the touch area may also be obtained according to the envelope signal, and the touch subjects, such as the human face, the human ear, the finger and the palm may be obtained by analyzing the touch area. The analysis manner of the touch subject is not specifically limited herein.

In this embodiment, when the touch coordinate of each frame of data is obtained through calculation, different touch subjects may also be tracked, for example, a change relationship between the touch coordinates corresponding to a plurality of fingers in each frame may be tracked to determine a touch gesture. The touch gesture may include any of the following: single-finger hover, single-finger motion (slide), double-finger motion (slide), three-finger motion (slide) and palm motion (the palm sweeps the touch screen). The single-finger motion refers to, for example, moving left and right, moving up and down, or any other type of motion, for example, moving along a trajectory of a "W" shape or "M" shape or the like, above the touch screen. The double-finger motion refers to that, for example, double fingers moves toward each other or away from each other, or the like. The palm sweeping the touch screen may refer to that the palm sweeps the screen from down to up, from up to down, from left to right, from right to left or the like. The type of the touch gesture is not limited herein. When a touch gesture made by the palm is detected by using the preset large channel, whether the palm sweeps across may be determined according to size and change of the touch signal quantity. For example, when the touch signal quantity is changed to the touch signal quantity corresponding to the palm from a very small quantity and then gradually decreased, it is determined that the palm sweeps across.

Performing the touch operation corresponding to the touch type in step 703 is illustrated below.

For example, when a single finger hovers on a particular APP icon, the APP may be previewed. When a single finger slides left or right, pages may be turned left or right. When a single finger slides up or down, pages may be turned up or down. When double fingers slide relative to each other, a zoom-in or zoom-out operation may be performed. When three fingers slide along one direction, a drag operation may be performed.

The above-described touch detection method may also be applied to proximity sensing, for example, palm proximity sensing. Specifically, for example, in a screen-off state, the touch screen may be awakened when it is detected that the palm sweeps across the touch screen; in a screen-on state, task switching may be performed when it is detected that the palm sweeps across the touch screen.

According to the touch detection method of this embodiment, the proximity sensing function of a call may be conveniently realized by using the touch screen. Specifically, in the call and screen-on state, whether the human face or the human ear is detected may be determined through a sensing region on the upper half of the touch screen or the entire sensing region. If a human face or a human ear is detected, the screen may be turned off. In this way, a proximity sensor in the traditional electronic device may be replaced and screening openings are reduced.

Compared with the existing technology, the detection sensitivity of the hovering touch operation may be improved by using the merged channel in this embodiment, thereby improving the user experience.

Persons of ordinary skilled in the art may understand that the above-described embodiments are specific examples for implementing the present disclosure. In a practical application, various changes may be made in form and detail to the embodiments without departing from the spirit and the scope of the present disclosure.

What is claimed is:

1. A touch control chip, comprising:
   a processing unit;
   a floating ground driving module; and
   an analog front end;
   wherein, the floating ground driving module is connected to the analog front end, a detection terminal of the analog front end is connected to a capacitive sensing component, and an output terminal of the analog front end is connected to the processing unit, and
   the processing unit is configured to control the floating ground driving module to provide a floating ground signal to the analog front end, the floating ground signal is used to enable the capacitive sensing component to generate a sensing signal, and the processing unit performs touch detection according to the sensing signal;
   wherein the touch control chip further comprises a switch array,
   wherein the capacitive sensing component is connected to the analog front end through the switch array; the floating ground driving module is further configured to provide the floating ground signal to the processing unit and the switch array.

2. The touch control chip according to claim 1, wherein the floating ground driving module comprises a first driver and a second driver;
   wherein an output terminal of the first driver is connected to a ground terminal of the analog front end;
   the output terminal of the first driver is further connected to a power terminal of the analog front end through the second driver;
   the first driver is used to output the floating ground signal to the ground terminal of the analog front end, and the second driver is used to synchronously output the floating ground signal to the power terminal of the analog front end.

3. The touch control chip according to claim 2, wherein the first driver is an inverter or a non-inverter.

4. The touch control chip according to claim 3, wherein the floating ground driving module further comprises a protection diode;
   a positive end of the protection diode is connected to a power input terminal of the floating ground driving module, and a negative end of the protection diode is connected to the power terminal of the analog front end.

5. The touch control chip according to claim 1, wherein the touch control chip further comprises a level converting module connected between the processing unit and an external main control unit, wherein the level converting module is configured to convert a communication level of the processing unit into a communication level of the main control unit.

6. The touch control chip according to claim 1, wherein the analog front end comprises an operational amplifier and an integrator, wherein the processing unit is configured to provide a preset floating ground control signal to the floating ground driving module, each of the floating ground control signals comprises P successive sub-control signals, and P is a natural number greater than 1;

an input terminal of the integrator is connected to an output terminal of the operational amplifier, and is used to accumulate touch detection signals under actions of the P successive sub-control signals in each of the floating ground control signals.

7. An electronic device, comprising:

a touch control chip, wherein the touch control chip, comprises:

a processing unit;

a floating ground driving module; and an analog front end, wherein, the floating ground driving module is connected to the analog front end, a detection terminal of the analog front end is connected to a capacitive sensing component, and an output terminal of the analog front end is connected to the processing unit, and the processing unit is configured to control the floating ground driving module to provide a floating ground signal to the analog front end, the floating ground signal is used to enable the capacitive sensing component to generate a sensing signal, and the processing unit performs touch detection according to the sensing signal, wherein the touch control chip further comprises a switch array, wherein the capacitive sensing component is connected to the analog front end through the switch array; the floating ground driving module is further configured to provide the floating ground signal to the processing unit and the switch array; and a capacitive sensing component, wherein the touch control chip is connected with the capacitive sensing component, and is configured to perform touch detection through the capacitive sensing component.

8. A touch detection method, being applied to an electronic device, wherein the electronic device comprises:

a touch control chip comprising: a processing unit, a floating ground driving module, and an analog front end, wherein the floating ground driving module is connected to the analog front end, a detection terminal of the analog front end is connected to a capacitive sensing component, and an output terminal of the analog front end is connected to the processing unit, the processing unit is configured to control the floating ground driving module to provide a floating ground signal to the analog front end, the floating ground signal is used to enable the capacitive sensing component to generate a sensing signal, and the processing unit performs touch detection according to the sensing signal; wherein the touch control chip further comprises a switch array, wherein the capacitive sensing component is connected to the analog front end through the switch array; the floating ground driving module is further configured to provide the floating ground signal to the processing unit and the switch array; and a capacitive sensing component, wherein the touch control chip is connected with the capacitive sensing component, and is configured to perform touch detection through the capacitive sensing component, wherein a touch screen of the electronic device comprises a plurality of sensing channels, and the touch detection method comprises:

collecting touch data on the touch screen of the electronic device by using a merged channel based on a preset channel merging strategy, wherein the merged channel refers to a touch sensing channel formed by connecting two or more sensing channels to a same detection circuit of the analog front end;

determining a touch type according to the touch data; and performing a touch operation corresponding to the touch type.

9. The touch detection method according to claim 8, wherein collecting the touch data on the touch screen of the electronic device by using the merged channel based on the preset channel merging strategy comprises:

detecting a touch operation type of the electronic device, and collecting the touch data by using the merged channel under the channel merging strategy corresponding to the touch operation type.

10. The touch detection method according to claim 9, wherein when the touch operation type is a first type, collecting the touch data by using the merged channel under the channel merging strategy corresponding to the touch operation type comprises:

collecting the touch data by changing the merged channel from large to small.

11. The touch detection method according to claim 9, wherein when the touch operation type is a second type, the merged channel is a preset large channel, and the touch data is collected by using the preset large channel.

12. The touch detection method according to claim 11, wherein the preset large channel comprises a merged channel obtained in any of the following merging manners: merging all sensing channels of the touch screen, merging sensing channels in an upper half of the touch screen, merging sensing channels in a lower half of the touch screen, and merging sensing channels outside an edge of the touch screen.

13. The touch detection method according to claim 10, wherein collecting the touch data by changing the merged channel from large to small comprises:

collecting the touch data by using an initial large channel; reducing the merged channel when a touch signal is detected from the touch data collected by using the initial large channel, continue reducing the merged channel until the merged channel is a preset small channel when a touch signal is detected from the touch data collected by using the reduced merged channel, and collecting the touch data by using the preset small channel.

14. The touch detection method according to claim 13, wherein the merged channel before reduction is used to collect the touch data and detect the touch signal when a touch signal is not detected from the touch data collected by using the reduced merged channel; and the merged channel is further increased until the channel is restored to the initial large channel when a touch signal is not detected by using the merged channel before reduction.

15. The touch detection method according to claim 14, wherein determining the touch type according to the touch data specifically comprises:
  extracting a plurality of frames of data from the touch data;
  obtaining a touch subject by analyzing the plurality of frames of data, and calculating a touch coordinate of each frame of data by a gravity center method; and
  obtaining a touch gesture according to the touch subject and the touch coordinate of each frame of data.

16. The touch detection method according to claim 13, wherein the touch data is collected by using the merged channel before reduction when a touch signal is detected by using the merged channel before reduction.

17. The touch detection method according to claim 13, wherein switching to a touch detection mode is performed when a signal quantity in the touch data collected by using the preset small channel is greater than a touch threshold, wherein the merged channel in the touch detection mode is smaller than the preset small channel.

18. The touch detection method according to claim 13, wherein determining the touch type according to the touch data specifically comprises:
  extracting a plurality of frames of data from the touch data;
  obtaining a touch subject by analyzing the plurality of frames of data, and calculating a touch coordinate of each frame of data by a gravity center method; and
  obtaining a touch gesture according to the touch subject and the touch coordinate of each frame of data.

19. The touch detection method according to claim 18, wherein the touch gesture comprises any of the following: single-finger hover, single-finger motion, double-finger motion, three-finger motion and palm motion.

* * * * *